United States Patent [19]
Thacker

[11] Patent Number: 6,163,537
[45] Date of Patent: Dec. 19, 2000

[54] INTEGRATION OF TELEPHONE RETURN LINK USING FIBER AND CABLE MEDIA

[75] Inventor: John C. Thacker, Los Altos, Calif.

[73] Assignee: CyberStar, L.P., Palo Alto, Calif.

[21] Appl. No.: 09/228,669

[22] Filed: Jan. 12, 1999

[51] Int. Cl.[7] .............................. H04H 1/02; H04J 14/00
[52] U.S. Cl. ............................ 370/352; 348/12; 709/219
[58] Field of Search ...................... 348/12, 13; 370/352; 455/5.1; 709/219

[56] References Cited

U.S. PATENT DOCUMENTS

| | | | |
|---|---|---|---|
| 5,534,913 | 7/1996 | Majeti et al. | 348/7 |
| 5,586,121 | 12/1996 | Moura et al. | 370/404 |
| 5,903,558 | 5/1999 | Jones et al. | 370/351 |
| 6,018,767 | 1/2000 | Fijolek et al. | 709/218 |

OTHER PUBLICATIONS

Olshansky, R., 'Microwave Subcarrier Multiplexing: New Approach to Wideband Lightwave Systems', IEEE Circuits and Devices Magazine, pp. 8–14, Nov. 1998.

Cohen, R. et al., 'TCP for High Performance in Hybrid Fiber Coaxial Broad–Band Access Networks', IEEE Transactions On Broadcasting, vol. 6, No. 1, pp. 15–29, Feb. 1998.

Huang, N.F. et al., 'A Hierarchical HFC Network with Qos Guaranteed Traffic Policy', IEEE Transactions On Broadcasting, vol. 44, No. 4, pp. 571–526, Dec. 1998.

*Primary Examiner*—Melvin Marcelo
*Attorney, Agent, or Firm*—Kenneth W. Float

[57] ABSTRACT

Systems and methods for integrating a telephone internal access return link with an upstream data carrier using a fiber optic network and downstream data transfer using a cable TV system. The systems and methods provide for a cost effective implementation of a data over cable TV system using the cable system for downstream data transfer and a telephone modem for upstream data transfer. The telephone return path is terminated at a neighborhood node or optical network interface of the cable TV system. The optical network interface combines, modulates, and multiplexes the upstream data onto an upstream fiber carrier. At the cable headend, the carrier is demultiplexed, demodulated, and the data is forwarded to a remote access server of an Internet service provider.

15 Claims, 3 Drawing Sheets

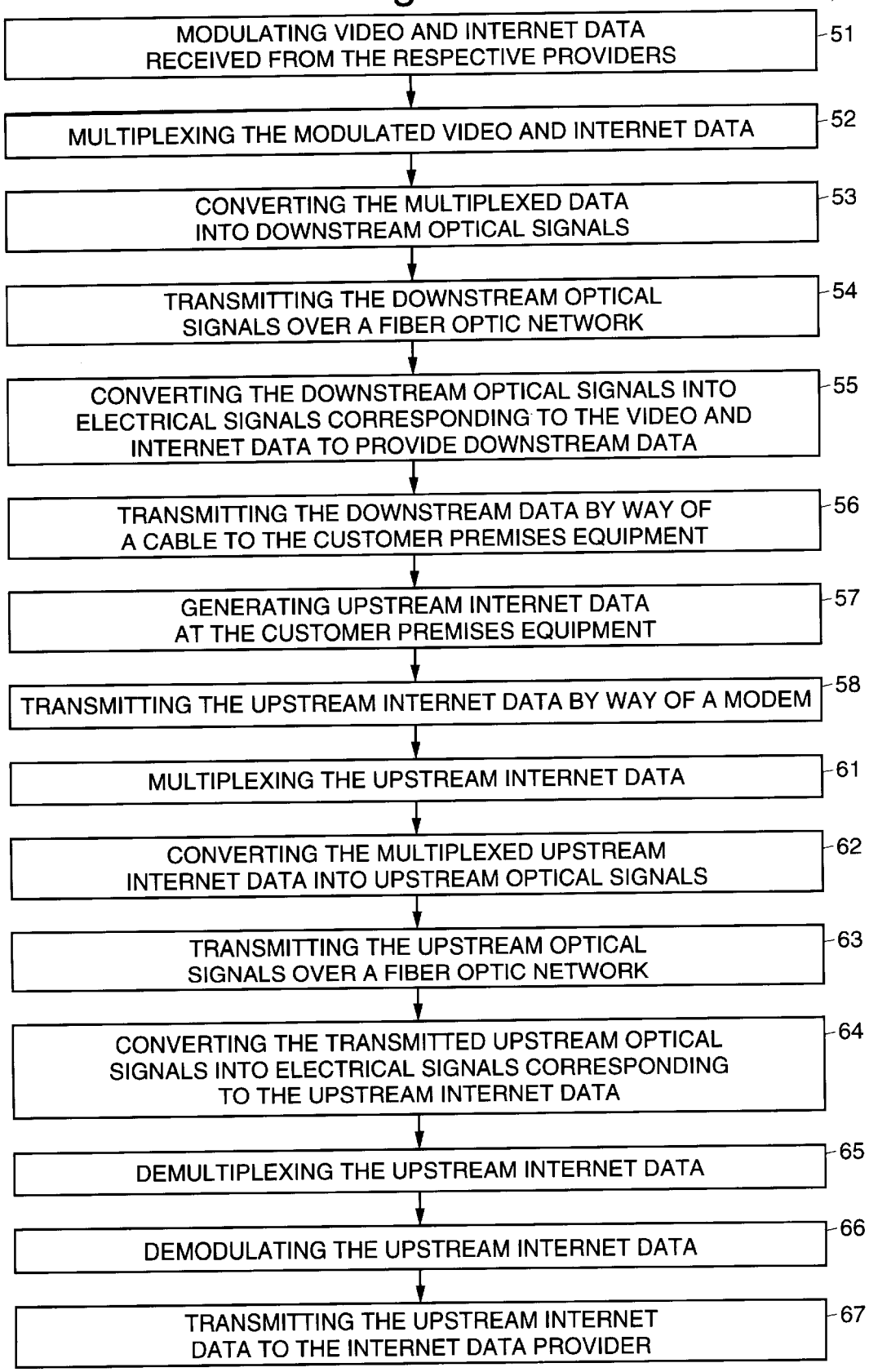

INTEGRATION OF TELEPHONE RETURN LINK USING FIBER AND CABLE MEDIA

BACKGROUND

The present invention relates generally to systems and methods that provide for analog and digital subcarrier multiplexing a over cable TV hybrid fiber coax (HFC) system, and more particularly, to systems and methods that integrate a telephone internal access return link with an upstream data carrier using fiber media and downstream data transfer using a cable TV system.

U.S. Pat. No. 5,534,913 discloses a method and apparatus for integrating downstream data transfer over a cable television channel with an upstream data carrier using other media. In accordance with the teachings of this patent, a split channel bridging unit is provided that includes a router that operates under the control of a control processor to route packets of information destined for a user to a modulator which is connected to the cable distribution head-end of a cable television system which serves the requesting user. The modulator encodes digital information transmitted from the router and encodes it in an RF channel to be carried by the television cable. The cable distribution head-end combines this channel with other conventional cable television sources to broadcast these channels to its users. Customer premises equipment of the user includes an RF demodulator that demodulates the RF encoded signals and a packet receiver that transmits the digital information addressed to the particular user to the user's personal computer. Upstream requests are made by the user by utilizing a modem connection over the public switched telephone network with a terminating modem contained in the split channel bridging unit. Secured low-speed control information is supported bidirectionally using a modem connection over the public switched telephone network.

U.S. patent application Ser. No. 09/243,780 filed Feb. 4, 1999 assigned to the assignee of the present invention discloses a method and apparatus for integrating interactive local Internet access and downstream data transfer over a cable TV system with upstream data carrier using other media. Local Internet access downstream of the cable headend is provided by this invention. Customer premises equipment accesses the Internet via the local downstream data service provider with standard modem interfaces. A customer request is multiplexed on the down stream data channel. At the local cable distribution node or hub, the customer request is routed through a local Internet access subsystem to a local Internet Service Provider. The cable distribution hub includes a data channel filter that blocks the customer generated Internet traffic. The local Internet access subsystem interface returns customer destined data to the cable distribution hub. The cable distribution hub combines the local Internet access subsystem data and the downstream data and video into a composite downstream transmission containing video, downstream data and locally provided Internet data.

In order to improve upon the above-discussed systems, it would be an advance in the art to have a system and methods that is more cost-effective and that integrates a telephone internal access return link with an upstream data carrier using fiber media and downstream data transfer using a cable TV system.

SUMMARY OF THE INVENTION

The present invention provides for systems and methods that integrate a telephone internal access return link with an upstream data carrier using fiber media and downstream data transfer using a cable TV system. The present invention implements a cost effective a data over cable TV system using the cable system for downstream data transfer and a standard telephone modem for upstream data transfer.

One exemplary embodiment of a data communication system in accordance with the present invention comprises a fiber optic network, customer premises equipment for processing video data and Internet data, and a cable modem for routing data to the customer premise equipment. Cable TV system headend equipment processes video data and downstream Internet data derived from Internet service providers. The headend equipment comprises circuitry that converts the video and downstream Internet data into optical signals and transmits the optical signals over the fiber optic network. The headend equipment also comprises circuitry that processes upstream Internet data and transmits it to the Internet service provider.

Optical network interface equipment processes received optical signals and converts them into the video data and the downstream Internet data and transmits the video and downstream Internet data by way of the cable TV system to the customer premise equipment. The optical network interface equipment provides a terminated telephone return path from the customer premise equipment to the Internet service provider. The optical network interface equipment processes upstream Internet data to convert it into optical signals for transmission to the headend equipment by way of the fiber optic network.

The system terminates the telephone return path at the optical network interface (neighborhood node) of the cable TV system. The system combines, modulates, and multiplexes the upstream data onto an upstream fiber carrier. At the cable headend, the carrier is demultiplexed, demodulated, and the data is forwarded to a remote access server and ISP network.

The present invention provides a local telephone connection, via the fiber optic network, as the return link while accessing an Internet Service Provider (ISP). This avoids costly "800" telephone access as well as long distance charges to customers. The present invention allows for the aggregation of ISP return path terminations and which are independent of inter-exchange carriers (long distance telephone companies).

An exemplary method of communicating data between video and Internet data providers and customer premises equipment of a subscriber of a cable TV system comprises the following steps. Video and Internet data received from providers is processed to generate downstream optical signals for transmission. The downstream optical signals are transmitted over a fiber optic network. The downstream optical signals transmitted over the fiber optic network is processed to generate electrical signals corresponding to the video and Internet data. The downstream data is transmitted by way of a cable to the customer premises equipment.

Upstream Internet data is generated at the customer premises equipment. The upstream Internet data is transmitted by way of an upstream data return path. The upstream Internet data is processed to generate upstream optical signals. The upstream optical signals are transmitted over the fiber optic network. The upstream optical signals are processed to generate upstream Internet data. The upstream Internet data is transmitted to the Internet data provider.

BRIEF DESCRIPTION OF THE DRAWINGS

The various features and advantages of the present invention may be more readily understood with reference to the following detailed description taken in conjunction with the accompanying drawing figures, wherein like reference numerals designate like structural elements, and in which:

FIG. 3 is a flow diagram illustrating an exemplary communications method in accordance with the principles of the present invention.

DETAILED DESCRIPTION

Figure 1:
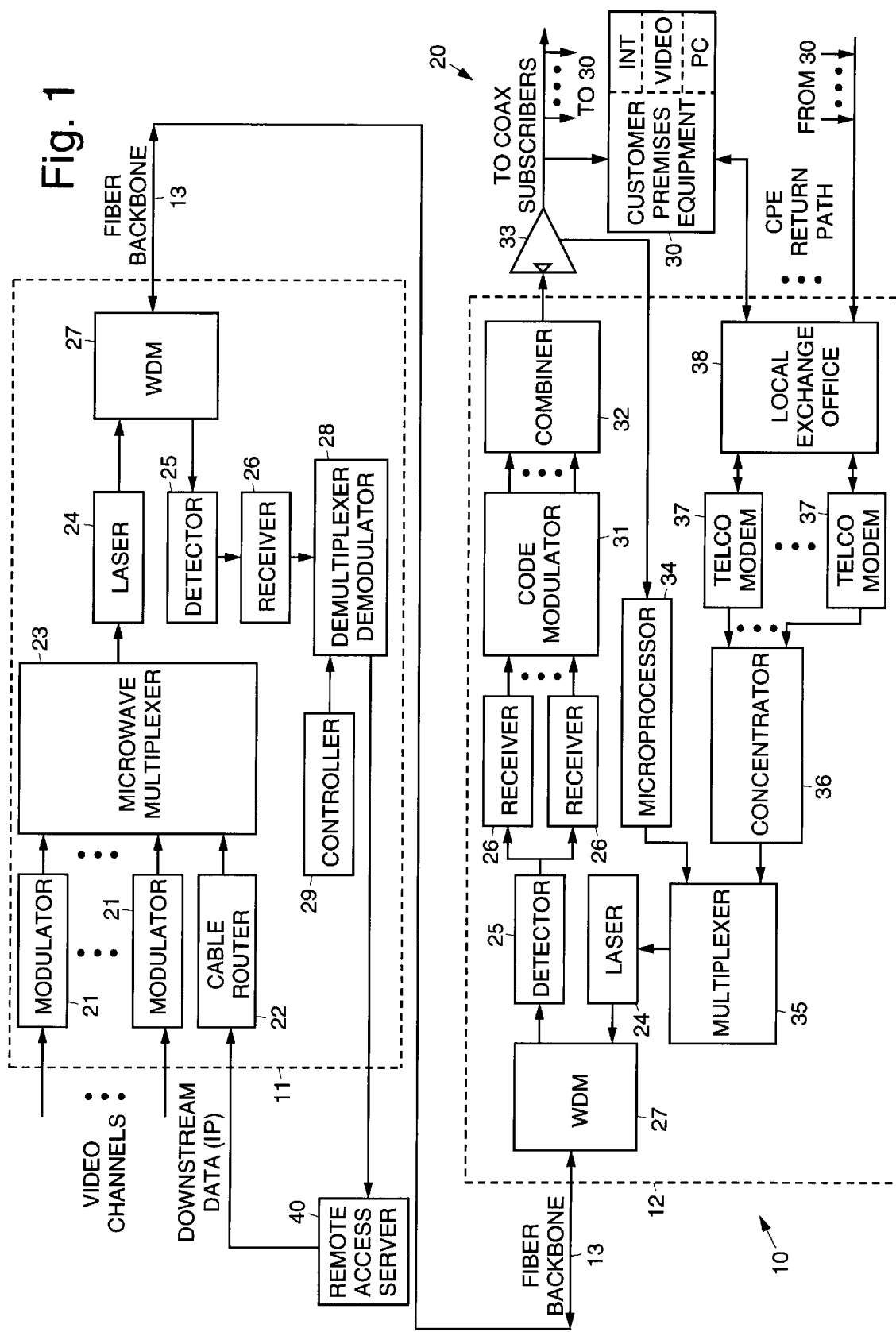
FIG. 1 illustrates an embodiment of an exemplary analog transmission system in accordance with the principles of the present invention.

Referring to the sole drawing figures, FIG. 1 illustrates an embodiment of an exemplary analog transmission system 10 in accordance with the principles of the present invention. The system 10 integrates a telephone internal access return link with an upstream Internet data carrier using fiber media and downstream data transfer using a cable TV system 20.

The system 10 comprises hybrid fiber coax (HFC) cable TV system headend equipment 11 and neighborhood node equipment 12, or optical network interface (ONI) equipment 12, that are interconnected by way of a fiber optic backbone network 13. The optical network interface equipment 12 provides an interface between the fiber optic network 13 and the cable TV (coax) system 20. The downstream data is transferred over optical fibers of the fiber optic network 13 to the optical network interface equipment 12, and is directly passed by way of the cable TV (coax) system 20 to customer premise equipment 30 of subscribers. The optical network interface equipment 12 interfaces with the customer premise equipment 30 to transmit the downstream data via a cable modem 33. The upstream Internet data is returned from the customer premise equipment 30 via a telephone modem 37.

The hybrid fiber coax cable TV system headend equipment 11 comprises a plurality of modulators 21 that receive video data from a plurality of video channels. Video data received by the modulators 21 are coupled to a microwave multiplexer 23 along with downstream data received by way of a cable router 22. The output of the microwave multiplexer 23 is fed to a laser 24 that converts data for transmission into optical signals that are input to a wave division multiplexer (WDM) 27 that interfaces to optical fibers of the fiber optic network 13.

The headend equipment 11 also receives optical signals corresponding to upstream Internet data. The wave division multiplexer 27 processes the received optical signals corresponding to the upstream Internet data. The received optical signals are processed by a detector 25 and a receiver 26 which converts the optical signals into electrical data and outputs the data to a demultiplexer and demodulator 28 that is controlled by a controller 29. Demultiplexed and demodulated data output by the demultiplexer and demodulator 28 is transmitted to a remote access server 40 of the Internet service provider.

The neighborhood node equipment 12, or optical network interface equipment 12 comprises a wave division multiplexer 27 that interfaces to optical fibers of the fiber optic network 13. Data received by the wave division multiplexer 27 transmitted over the fiber optic network 13 is processed by a detector 25 and a plurality of receivers 26 which output the data derived from the various data sources to a code modulator 31. The code modulator 31 modulates the data and inputs it to a combiner 32 that outputs the data to subscribers of the cable TV (coax) system 20 by way of the cable modem 33 that is coupled to the customer premises equipment 30.

The cable modem 33 is also coupled to a microprocessor 34 that controls a multiplexer 35 used to multiplex data that is transmitted back to the headend equipment 11 from the customer premises equipment 30. The customer premises equipment 30 has a return path that is routed by way of local exchange office equipment 38 of a telephone carrier. The local exchange office equipment 38 is coupled to a plurality of modems 37 that are each coupled to a concentrator 36. The concentrator 36 outputs data to a multiplexer 35 that multiplexes data that is input to a laser 24 that outputs data over the fiber optic network 13 by way of the wave division multiplexer 27.

Thus, the telephone return path is terminated at the neighborhood node equipment 12 using standard telephone modems 37 and a concentrator 36. This concentrated return data is multiplexed by the multiplexer 35 onto an upstream carrier using the laser 24, and is transmitted via the fiber optic network 13. The return data is routed to the ISP remote access server 40 and ISP network.

The system 10 provides a local telephone connection, via the fiber optic network 13, as the return link while accessing an Internet service provider. This avoids costly "800" telephone access and long distance charges to subscribers of the cable TV system 20. The system 10 allows for the aggregation of return path terminations from various Internet service providers which are independent of inter-exchange carriers (long distance telephone companies).

Figure 2:
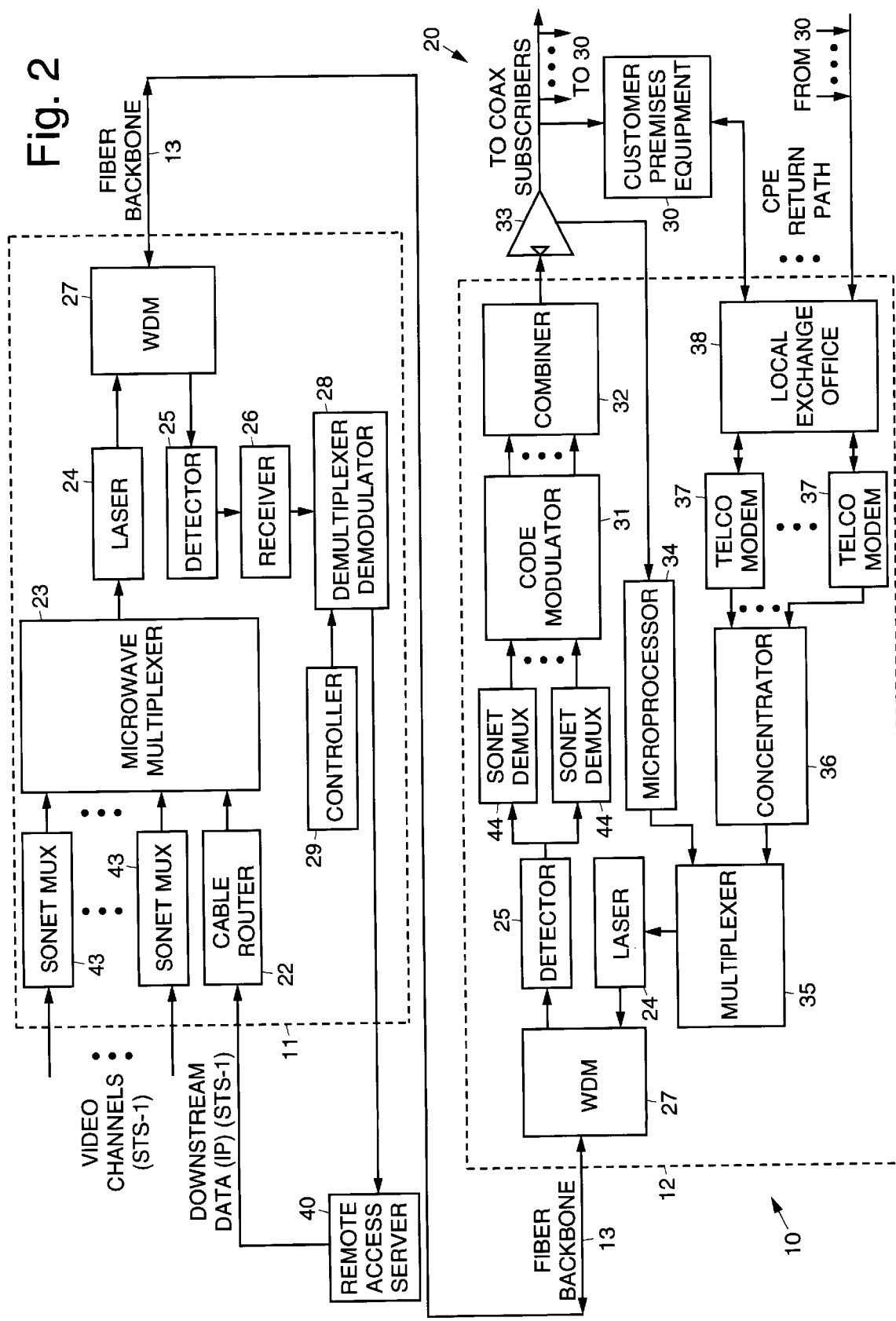
FIG. 2 illustrates an embodiment of an exemplary digital transmission system in accordance with the principles of the present invention.

FIG. 1 shows the details of an analog transmission system 10. The architecture for handling the telephone return is the same when using a digital transmission system 10. FIG. 2 illustrates an embodiment of an exemplary digital transmission system 10 in accordance with the principles of the present invention. The difference between the analog and digital transmission systems 10 is that the modulators 21 and receivers 26 used in the analog system 10 are replaced by SONET multiplexers 43 and SONET demultiplexers 44, respectively, and the input data streams comprise STS-1 input data streams.

In either of the two embodiments shown in FIGS. 1 and 2, the hybrid fiber coax cable TV system headend equipment 11 may be located anywhere on the fiber optic network 13, and as such, the architecture of the present invention applies to regional headend equipment 11 or super-headend equipment 11 serving multiple cable TV networks. Also, the telephone return may be terminated at any optical network interface to the network 13 regardless of the media connected to the network 13, including fiber to fiber interfaces.

FIG. 3 is a flow diagram illustrating an exemplary communications method 50 in accordance with the principles of the present invention. The method 50 communicates data between video and Internet data providers and customer premises equipment of a subscriber of a cable TV system. The method 50 comprises the following steps.

Video and Internet data received from the respective providers is processed to generate downstream optical signals for transmission. In particular, the video and Internet data received from providers is modulated 51 and multiplexed 52, and the multiplexed data is converted 53 into downstream optical signals. The downstream optical signals are transmitted 54 over a fiber optic network. The downstream optical signals are converted 55 into electrical signals corresponding to the video and Internet data to provide downstream data. The downstream data is transmitted 56 by way of a cable to the customer premises equipment.

Upstream Internet data is generated 57 at the customer premises equipment. The upstream Internet data is processed to generate upstream optical signals. More particularly, the upstream Internet data is transmitted 58 by way of a modem and multiplexed 61, and the multiplexed upstream Internet data is converted 62 into upstream optical signals. The upstream optical signals are transmitted 63 over a fiber optic network. The transmitted upstream optical signals are processed to generate upstream Internet data. In particular, the transmitted upstream optical signals are converted 64 into electrical signals corresponding to the upstream Internet data. The upstream Internet data is demultiplexed 65 and demodulated 66, and the upstream Internet data is transmitted 67 to the Internet data provider.

Thus, systems and methods have been disclosed that integrate a telephone internal access return link with an upstream Internet data carrier using fiber media and downstream data transfer using a cable TV system. It is to be understood that the described embodiments are merely illustrative of some of the many specific embodiments which represent applications of the principles of the present invention. Clearly, numerous and other arrangements can be readily devised by those skilled in the art without departing from the scope of the invention.

What is claimed is:

1. A data communication system comprising:
   a fiber optic network;
   customer premises equipment for processing video data and Internet data:
   a cable modem coupled to the customer premise equipment by way of a coaxial cable;
   cable TV system headend equipment coupled to the fiber optic network for processing video data and for processing downstream Internet data derived from an Internet service provider, comprising circuitry for converting the video data and downstream Internet data into optical signals and transmitting the optical signals over the fiber optic network, and for processing upstream Internet data and transmitting it to the Internet service provider;
   optical network interface equipment coupled to the fiber optic network for processing received optical signals to convert them into the video data and the downstream Internet data, for transmitting the video data and downstream Internet data by way of the cable TV system to the customer premise equipment, for providing a terminated telephone return path from the customer premise equipment to the Internet service provider, and for processing upstream Internet data to convert it into optical signals for transmission to the headend equipment by way of the fiber optic network.

2. The system recited in claim 1 wherein the optical network interface equipment comprises a cable modem that interfaces with the customer premise equipment.

3. The system recited in claim 1 wherein the upstream data is returned from the customer premises equipment via a telephone modem.

4. The system recited in claim 1 wherein the customer premises equipment comprises a personal computer, cable TV system interface, and a video output device coupled to the cable TV system interface.

5. The system recited in claim 1:
   wherein the cable TV system headend comprises:
      a plurality of modulators that receive video data from a plurality of video channels;
      a router for receiving downstream Internet data;
      a multiplexer for multiplexing the video data and downstream Internet data;
      a laser coupled to the multiplexer for converting the video and downstream Internet data into optical signals;
      a wave division multiplexer coupled to the fiber optic network for transmitting the optical signals corresponding to the video data and downstream Internet data over the fiber optic network and for receiving optical signals corresponding to upstream Internet data from the optical network interface equipment;
      a detector and a receiver 26 for converting the optical signals into electrical signals; and
      a demultiplexer and demodulator for converting the electrical signals into upstream Internet data and for transmitting the upstream Internet data to a remote access server of the Internet service provider; and
   wherein the optical network interface equipment comprises:
      a wave division multiplexer that interfaces to the fiber optic network for receiving optical signals corresponding to downstream data from the system headend and for transmitting optical signals corresponding to the upstream Internet data over the fiber optic network;
      a detector and a plurality of receivers for processing the downstream data transmitted over the fiber optic network;
      a code modulator for modulating the downstream data derived from the plurality of receivers;
      a combiner for combining the modulated outputs of the code modulator for distribution to the customer premises equipment by way of the cable modem;
      a plurality of modems that are coupled to and terminate return paths from the customer premises equipment;
      a concentrator coupled to the plurality of modems that combine the outputs of the plurality of modems;
      a microprocessor coupled to the cable modem;
      a multiplexer coupled to the microprocessor and the concentrator for multiplexing data to be transmitted to the headend; and
      a laser coupled to the multiplexer for converting the upstream Internet data into optical signals for transmission over the fiber optic network.

6. The system recited in claim 1 wherein:
   wherein the cable TV system headend comprises:
      a plurality of SONET multiplexers that receive video data from a plurality of video channels;
      a router for receiving downstream Internet data;
      a multiplexer for multiplexing the video data and downstream Internet data;
      a laser coupled to the multiplexer for converting the video and downstream Internet data into optical signals;
      a wave division multiplexer coupled to the fiber optic network for transmitting the optical signals corresponding to the video data and downstream Internet data over the fiber optic network and for receiving optical signals corresponding to upstream Internet data from the optical network interface equipment;
      a detector and a receiver for converting the optical signals into electrical signals; and
      a demultiplexer and demodulator for converting the electrical signals into upstream Internet data and for transmitting the upstream Internet data to a remote access server of the Internet service provider; and
   wherein the optical network interface equipment comprises:
      a wave division multiplexer that interfaces to the fiber optic network for receiving optical signals corresponding to downstream data from the system headend and for transmitting optical signals corresponding to the upstream Internet data over the fiber optic network;

a detector and a plurality of SONET demultiplexers for processing the downstream data transmitted over the fiber optic network;

a code modulator for modulating the downstream data derived from the plurality of receivers;

a combiner for combining the modulated outputs of the code modulator for distribution to the customer premises equipment by way of the cable modem;

a plurality of modems that are coupled to and terminate return paths from the customer premises equipment;

a concentrator coupled to the plurality of modems that combine the outputs of the plurality of modems;

a microprocessor coupled to the cable modem;

a multiplexer coupled to the microprocessor and the concentrator for multiplexing data to be transmitted to the headend; and a laser coupled to the multiplexer for converting the upstream Internet data into optical signals for transmission over the fiber optic network.

7. A method of communicating data between video and Internet data providers and customer premises equipment of a subscriber of a cable TV system, comprising the steps of:

processing video and Internet data received from providers to generate downstream optical signals for transmission;

transmitting the downstream optical signals over a fiber optic network;

processing the downstream optical signals transmitted over the fiber optic network to generate electrical signals corresponding to the video and Internet data;

transmitting the downstream data by way of a cable to the customer premises equipment;

generating upstream Internet data at the customer premises equipment;

transmitting the upstream Internet data by way of an upstream terminated telephone return path;

processing the upstream Internet data to generate upstream optical signals;

transmitting the upstream optical signals over the fiber optic network;

processing the upstream optical signals to generate upstream Internet data; and transmitting the upstream Internet data to the Internet data provider.

8. The method recited in claim 7 wherein the step of processing video and Internet data comprises the steps of:

modulating video and Internet data received from the respective providers;

multiplexing the modulated video and Internet data; and converting the multiplexed data into downstream optical signals.

9. The method recited in claim 7 wherein the step of transmitting the upstream Internet data comprises the step of transmitting the upstream Internet data by way of an upstream terminated telephone return path using a modem.

10. The method recited in claim 7 wherein the step of processing the upstream Internet data comprises the steps of:

multiplexing the upstream Internet data;

converting the multiplexed upstream Internet data into upstream optical signals.

11. The method recited in claim 7 wherein the step of processing the upstream optical signals comprises the steps of:

converting the transmitted upstream optical signals into upstream electrical signals;

demultiplexing the upstream electrical signals; and demodulating the upstream electrical signals to generate the upstream Internet data.

12. A method of communicating data between video and Internet data providers and customer premises equipment of a subscriber of a cable TV system, comprising the steps of:

processing video and Internet data received from providers to generate downstream optical signals for transmission by modulating video and Internet data received from the respective providers, multiplexing the modulated video and Internet data, and converting the multiplexed data into downstream optical signals;

transmitting the downstream optical signals over a fiber optic network;

processing the downstream optical signals transmitted over the fiber optic network to generate electrical signals corresponding to the video and Internet data;

transmitting the downstream data by way of a cable to the customer premises equipment;

generating upstream Internet data at the customer premises equipment;

transmitting the upstream Internet data by way of an upstream terminated telephone return path;

processing the upstream Internet data to generate upstream optical signals;

transmitting the upstream optical signals over the fiber optic network;

processing the upstream optical signals to generate upstream Internet data; and transmitting the upstream Internet data to the Internet data provider.

13. The method recited in claim 12 wherein the step of transmitting the upstream Internet data comprises the step of:

transmitting the upstream Internet data by way of the upstream terminated telephone return path using a modem.

14. The method recited in claim 12 wherein the step of processing the upstream Internet data comprises the steps of:

multiplexing the upstream Internet data;

converting the multiplexed upstream Internet data into upstream optical signals.

15. The method recited in claim 12 wherein the step of processing the upstream optical signals comprises the steps of:

converting the transmitted upstream optical signals into upstream electrical signals;

demultiplexing the upstream electrical signals; and demodulating the upstream electrical signals to generate the upstream Internet data.

* * * * *